No. 761,280. PATENTED MAY 31, 1904.
J. E. WOODBRIDGE.
POTENTIAL INDICATOR FOR HIGH VOLTAGE CIRCUITS.
APPLICATION FILED OCT. 30, 1902.
NO MODEL.
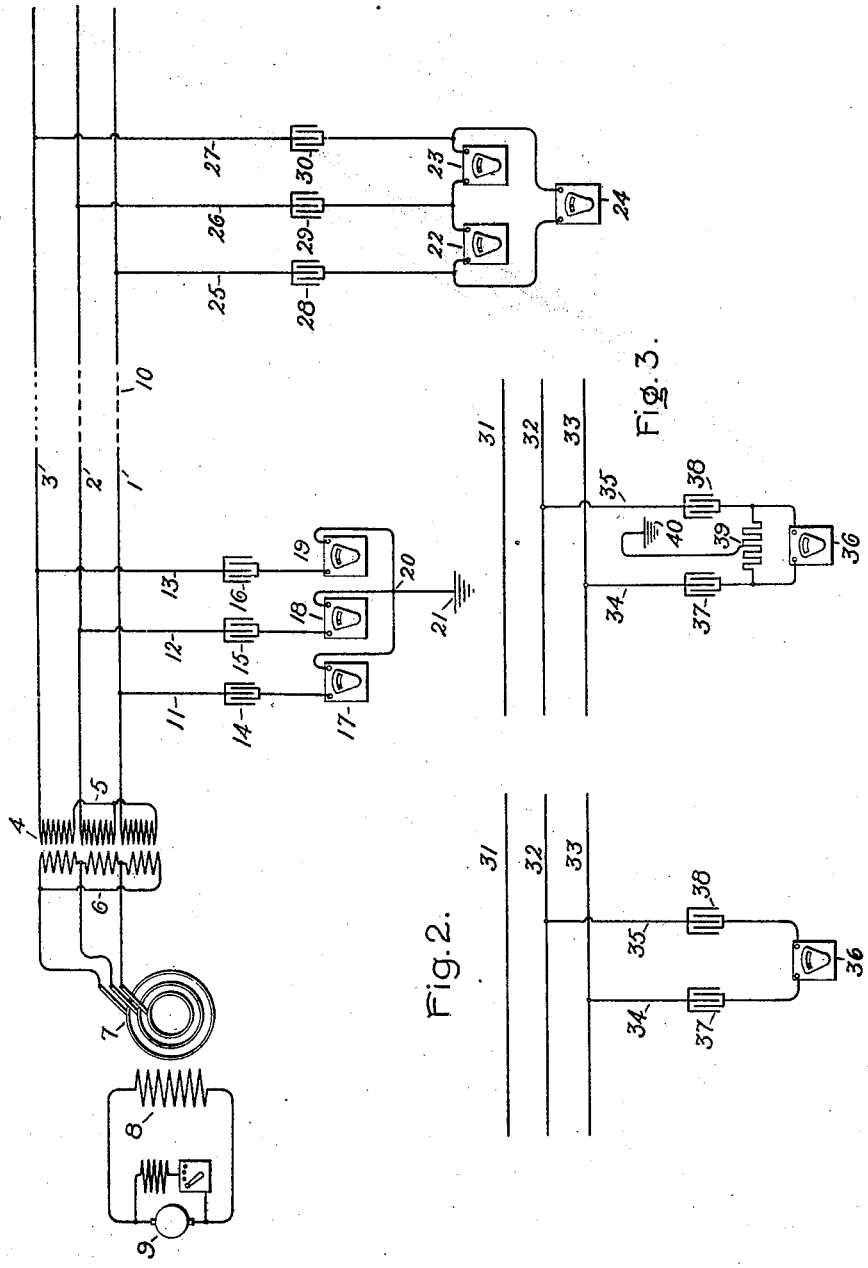
Witnesses.
Inventor.
Jonathan E. Woodbridge,
by Albert G. Davis
Atty.

No. 761,280. Patented May 31, 1904.

UNITED STATES PATENT OFFICE.

JONATHAN E. WOODBRIDGE, OF ALBANY, NEW YORK, ASSIGNOR TO GENERAL ELECTRIC COMPANY, A CORPORATION OF NEW YORK.

POTENTIAL-INDICATOR FOR HIGH-VOLTAGE CIRCUITS.

SPECIFICATION forming part of Letters Patent No. 761,280, dated May 31, 1904.

Application filed October 30, 1902. Serial No. 129,386. (No model.)

*To all whom it may concern:*

Be it known that I, JONATHAN E. WOODBRIDGE, a citizen of the United States, residing at Albany, in the county of Albany, State of New York, have invented certain new and useful Improvements in Potential-Indicators for High-Voltage Circuits, of which the following is a specification.

For measuring or indicating the voltage of extra high-potential circuits—such, for example, as twenty thousand volts or over—it is the common practice to make use of potential-transformers the primaries of which are connected across the mains the voltages of which are to be measured and the secondaries to the voltmeters or other measuring instruments. While the use of such potential-transformers is quite satisfactory in practice, they are open to the objection of excessive cost on account of the nature of the windings and the high degree of insulation required. For accomplishing the same general result I have, therefore, devised an arrangement which is simple and cheap in construction and reliable in operation. Instead of employing a potential transformer or transformers I connect a condenser in each of the leads extending from the high-voltage mains and then join the free ends of these condensers to suitable measuring instruments—such, for example, as an alternating-current milliampere-meter. Those condenser-terminals which are connected to the measuring instruments are, therefore, maintained at potentials corresponding to those of the high-voltage mains, while at the same time the high-voltage current in the mains is effectually separated from the instrument-circuit. The indications of the instruments are proportional to the product of the voltage and frequency, and when the frequency is constant, or approximately so, the indicating instrument furnishes a true measure of the voltage of the high-potential mains.

The scope of my invention I have pointed out with particularity in the appended claims, while the various features involved in the construction and mode of operation of the invention I have set forth in detail in the following description, which is to be taken in connection with the accompanying drawings, in which—

Figure 1 represents the application of my invention to a high-potential alternating-current system, while Figs. 2 and 3 show modifications.

As illustrative of a high-potential system, Fig. 1 shows three transmission-lines 1 2 3 supplied with current through a set of step-up transformers 4, the secondaries 5 of which are connected in Y relation to the transmission-lines and the primaries 6 in delta relation to each other and to an alternating-current generator, the three collector-rings of which are indicated at 7 and the field winding and exciter at 8 and 9, respectively. The transmission-lines 1 2 3 are of indefinite extent, as indicated by the dotted extensions 10, and may be utilized for supplying translating devices of any desired character. One arrangement for indicating the voltages of the system is indicated at the left of Fig. 1 and is arranged in proximity to the transmitting end of the line. In this arrangements three leads 11, 12, and 13 extend, respectively, from the transmission-lines 1, 2, and 3 and in turn are connected, respectively, to condensers 14, 15, and 16. The free terminals of the condensers are connected, respectively, to terminals of three alternating-current ammeters 17, 18, and 19, the remaining terminals of which are joined together at a common point 20 and this point grounded at 21. As thus arranged the indicating instruments or ammeters indicate the voltages between the neutral point of the system and the three transmission-lines. For this purpose alone the ground connection is unnecessary, but when employed serves the useful purpose of permitting the detection of any ground upon the transmission-lines. Thus when one of the transmission-lines is grounded—as, for example, the transmission-line 1—then it is evident that there will be no difference of potential between this transmission-line and ground—in other words, no current will flow through the indicating instrument or ammeter 17, thereby indicating at once the presence of a ground upon the line to which the instrument is connected. At another portion of the system it may be desired to measure the voltage between mains as distinguished between the voltage between the mains and a neutral point of the system. Under such circumstances the arrangement shown at the right-hand portion of Fig. 1 may be used, in which a set of measuring instruments is represented as connected to the receiving end of the line indicated by the right-hand portion of the figure. These indicating instruments are represented at 22, 23, and 24 and are connected in closed circuit or in delta relation to each other. The junctions between the instruments are connected to the transmission-lines 1, 2, and 3 by leads 25, 26, and 27, in each of which is interposed a condenser, these condensers being in turn represented at 28, 29, and 30. Each indicating instrument or ammeter is, as will readily be seen, connected across a pair of transmission-lines through leads, each of which has a condenser interposed therein. The condensers effectually insulate the instruments from the high-potential mains, and thus render it safe for the instruments to be mounted upon the switchboard or any other exposed places without danger to switchboard operatives or other attendants.

Where it is desired to measure or indicate the voltage between a single pair of mains only, it is of course only necessary to use a single pair of leads extending from these mains to the indicating instrument, but with a condenser interposed in each lead. This arrangement does not differ in principle from those already described, but is illustrated separately in Fig. 2, in which a set of three-phase mains is indicated at 31, 32, and 33 and an instrument-circuit extending from the mains 32 and 33 and consisting of leads 34 35, by which current is conveyed to the indicating instrument or ampere-meter 36 by electrostatic induction through the condensers 37 38, interposed, respectively, in these leads.

Where the indicating instrument used in any of the arrangements above described is chosen so as to be of small current capacity, then the condensers employed in coöperation therewith may be correspondingly small and cheap, and especially so if the circuits are of very high potential.

In order to provide against the possibility of breakdown of a condenser or condensers, whereby the potentials of the high-voltage mains may be impressed directly upon the instrument-circuit, thereby rendering the latter dangerous to an attendant or operative, I may ground the instrument, as shown in Fig. 3, in which a resistance or reactance 39 is represented as connected in shunt to the instrument and with its middle point grounded at 40. This removes any possible danger from the cause mentioned.

What I claim as new, and desire to secure by Letters Patent of the United States, is—

1. The combination of an alternating-current system, leads extending therefrom, condensers connected to said leads, and a current-measuring instrument connected to the free terminals of said condensers.

2. The combination of an alternating-current system, an electric-current-measuring instrument, and means for transmitting current to said measuring instrument by electrostatic induction.

3. The combination of an alternating-current system, a plurality of measuring instruments having one terminal of each connected together and to ground, leads extending from the free terminals of said instruments to mains or conductors of said system, and a device in each lead for conveying current by electrostatic induction.

4. The combination of an alternating-current system, an electric measuring or indicating instrument, means for transmitting current to said instrument by electrostatic induction, and means for grounding said instrument.

In witness whereof I have hereunto set my hand this 29th day of October, 1902.

JONATHAN E. WOODBRIDGE.

Witnesses:
BENJAMIN B. HULL,
HELEN ORFORD.